(No Model.) 4 Sheets—Sheet 1.

A. H. HEBBARD.
MACHINE FOR MAKING COMPOSITION TARGETS.

No. 540,053. Patented May 28, 1895.

WITNESSES:
F. L. Ourand
W. L. Coombs

INVENTOR:
Albert H. Hebbard,
by Dagger & Co.
Attorneys (No Model.) 4 Sheets—Sheet 3.

A. H. HEBBARD.
MACHINE FOR MAKING COMPOSITION TARGETS.

No. 540,053. Patented May 28, 1895.

WITNESSES:
F. L. Ourand
W. L. Coombs

INVENTOR:
Albert H. Hebbard
by Laws Jagger
Attorneys (No Model.) 4 Sheets—Sheet 4.

A. H. HEBBARD.
MACHINE FOR MAKING COMPOSITION TARGETS.

No. 540,053. Patented May 28, 1895.

WITNESSES:
F. L. Ourand
W. L. Coombs

INVENTOR:
Albert H. Hebbard,
by Lawis Daggu
Attorneys

UNITED STATES PATENT OFFICE.

ALBERT H. HEBBARD, OF NEW LONDON, CONNECTICUT, ASSIGNOR TO WILLIAM H. RANKIN, OF ELIZABETH, NEW JERSEY.

MACHINE FOR MAKING COMPOSITION TARGETS.

SPECIFICATION forming part of Letters Patent No. 540,053, dated May 28, 1895.

Application filed November 4, 1892. Serial No. 450,973. (No model.)

*To all whom it may concern:*

Be it known that I, ALBERT H. HEBBARD, a citizen of the United States, and a resident of New London, in the county of New London and State of Connecticut, have invented certain new and useful Improvements in Machines for Making Composition Targets; and I do hereby declare that the following is a full, clear, and exact description of the invention, which will enable others skilled in the art to which it appertains to make and use the same, reference being had to the accompanying drawings, which form a part of this specification.
My invention relates to improvements in machines for making what are known as composition targets, the object being to provide a novel construction of machine for this purpose in which the asphaltum or other composition is automatically fed to the pressing or molding devices, and automatically ejected from the molds, after being completed.

The invention consists in the novel construction and combination of parts hereinafter fully described and claimed.

Figure 1:
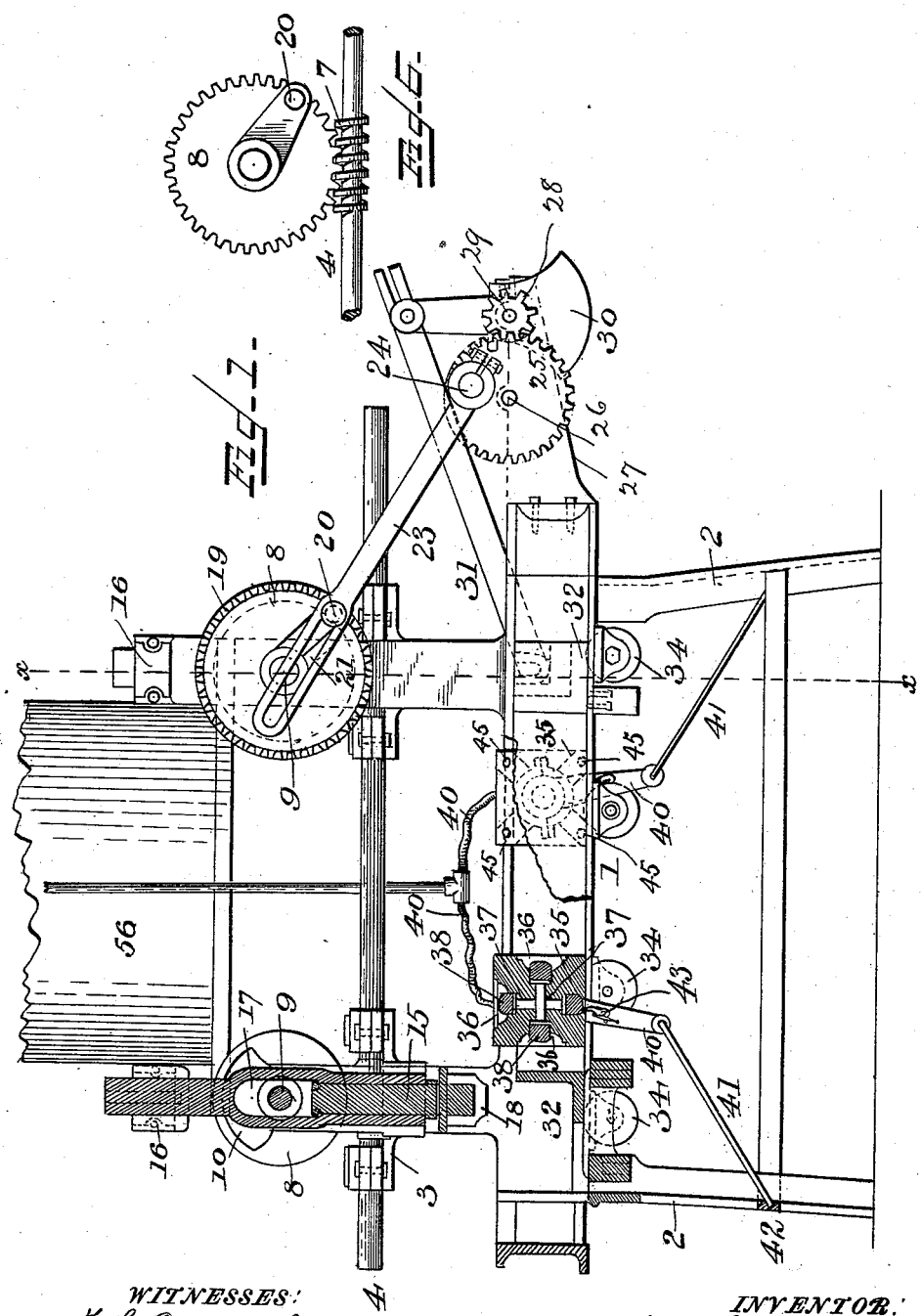
Figure 2:
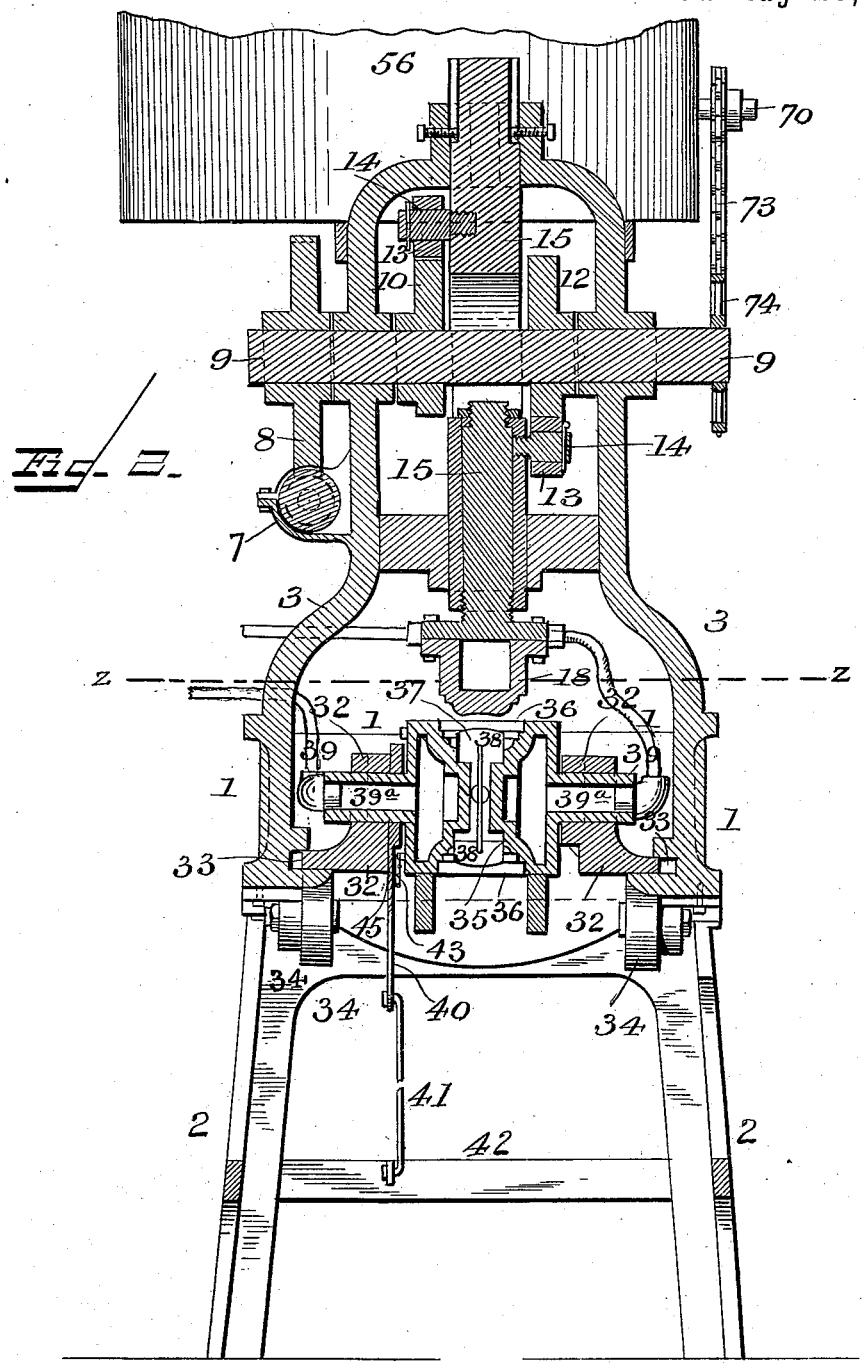
Figure 3:
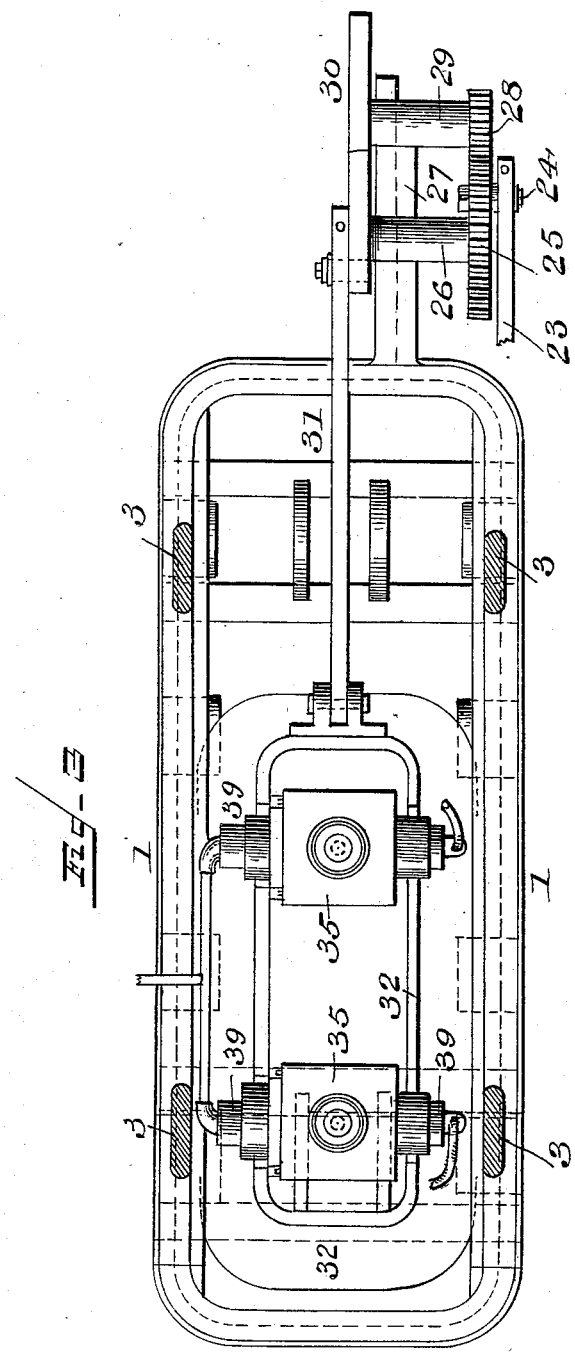
Figure 4:
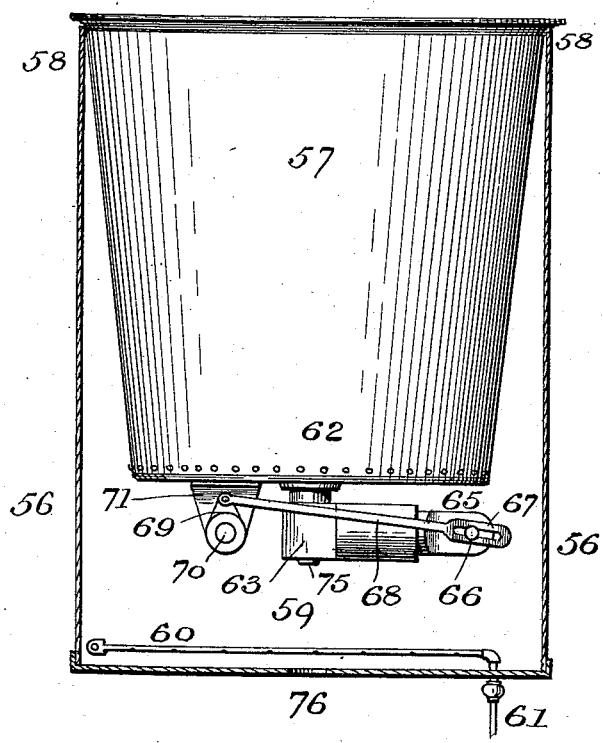
Figure 5:
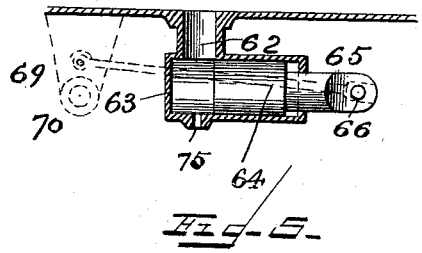

In the accompanying drawings, Figure 1 is a front elevation, partly in section, of a machine constructed in accordance with my invention. Fig. 2 is a section of the same on the line *x x*, Fig. 1. Fig. 3 is a horizontal section on the line *z z*, Fig. 2. Fig. 4 is a detail sectional view of the composition-kettle and feeding device. Fig. 5 is a similar view of the valve. Fig. 6 is a detail view of the main driving-shaft and worm-wheel.

In the said drawings, the reference numeral 1 designates a rectangular frame which supports the working parts of the machine mounted upon legs 2. Journaled in brackets 3, secured to this frame is the main driving shaft 4, provided at one end with a pulley not shown, connected by a belt, with a source of motive power. Near each end the shaft 4 is formed or provided with a worm 7, which meshes with worm-wheels 8, mounted upon transverse shafts 9, journaled in the upper part of the brackets 3. These shafts 9 which are located at opposite sides of the supply tank, hereinafter described, are provided with cams 10 and 12, which engage respectively with anti-friction rollers 13, journaled on studs 14 secured to plungers 15. These studs and rollers are located above and below the shafts 9, so that one of the cams tends to raise the plunger, while the other depresses it. The plungers which are journaled in the upper ends of the brackets 3 and in cross-bars 16, are slotted at 17, through which the shafts 9 pass, and are exact duplicates of each other, and at their lower ends are provided with a former 18, corresponding in relief with the shape or contour of the target.

Secured to one of the shafts 9 is a disk 19 having a wrist pin 20, which works in a slot 21, in a pitman 23, the other end of which is connected with a wrist or crank-pin 24, on a cog-wheel 25 secured to a transverse shaft 26, journaled in an extension 27 of the frame 1. This cogwheel meshes with a smaller but similar wheel 28 on a shaft 29 parallel to shaft 26 and also journaled in said extension and provided at its opposite end with a counterbalance crank 30 connected by means of a pitman 31 with a longitudinally reciprocating carriage 32, which works in ways 33 in the frame 1 and is supported by anti-friction rollers 34 journaled in said frame.

The numeral 35 designates two rotatable square mold heads or blocks having upon each of their faces molds 36, corresponding in shape with the formers upon the lower ends of the plungers, and each mold head is provided with two reciprocating plungers 37 at right angles to each other, having heads 38 which project into the molds. The mold heads or blocks are hollow, see Fig. 2, and are provided with journals 39, which have their bearings in the carriages 32. These journals are formed with passages 39ª and are provided with flexible hose 40, which communicate therewith. On one side of the machine the hose are connected with a water pipe, by means of which cold water may be conducted from any suitable source of supply, to the molds or blocks, and discharged through the passage and hose upon the opposite side. A constant circulation of water is thus kept up through the molds or blocks, preventing them from becoming unduly heated.

Pivotally connected with the journals 39 are downwardly depending crank arms 40, connected at their lower ends with rods 41, pivoted to end cross bars 42 secured to the legs 2. These crank-arms are provided with spring pawls or dogs 43, which engage with studs or pins 45 on the mold blocks so that as the latter are reciprocated, the dogs or pawls will cause them to make a quarter revolution, so as to present a new mold to the formers.

The numeral 56, designates a cylindrical casing supported upon the upper ends of frame 1, and within this casing is located a tapering kettle or receptacle 57 for containing the composition for making the targets. This kettle at its upper end is provided with an annular flange 58, which rests upon and is supported by the upper edge of the casing 56, and as it will be seen by referring to Fig. 4, it does not extend to the bottom of said casing forming a heating chamber 59 in which is located a gas, hot air or steam pipe 60, connected with a supply pipe 61. In the lower end of the kettle is a central feed-pipe 62 provided with a valve-box 63, in which is located a slide-valve 64, the stem 65 of which is provided with a stud 66, working in a slot 67, in a pitman 68, connected with a crank 69 on shaft 70. This crank is journaled in lugs 71, and one end projects through the casing and is provided with a chain-wheel 72, connected by means of an endless chain 73, with a chain wheel 74, on one of the shafts 9. The valve-box is provided with a discharge pipe 75, and the casing 56, with an opening 76, through which the liquid or plastic composition from the kettle is fed to the molds.

The operation will be readily understood. The kettle is filled with a suitable composition, such as is usually employed in manufacturing targets, and a supply of gas, hot-air, or steam is fed to the perforated pipe in the heating chamber where it is ignited. By this means the composition is kept at a high temperature, which I have found by experience, is necessary for the proper feeding of the same. The machine is then set in motion through the driving-shaft and connections and the carriage carrying the mold-blocks will be reciprocated back and forth, so that as one mold is aligned with one of the plungers 15, the other will be at the center of the machine. During this operation, the shafts 9 will be rotated through the medium of the pitman 23, disk 19, wrist-pin 20, worm-wheels 8, and worms 7, and the valve connected with the feed-pipe of the kettle will be alternately opened and closed by means of the chain-wheel 72, 74, chains 73, shaft 70 and connections being so limited as to open when one of the mold-blocks reaches the center of the machine and close just as it leaves the same. As each mold-block is alternately brought into line with its plunger 15, the latter will be depressed by the cams on the shaft 9, so as to compress the composition deposited in the mold by the feeding device. By the peculiar construction of the parts, as the reciprocating carriage carrying the mold-blocks reaches the end of its stroke, there is a short pause in order to allow the plunger to compress the material in the mold, and to allow the empty mold in the center of the machine to receive a fresh supply of composition from the feeding device. At each complete movement or stroke of the carriage 32, the mold-blocks, as they move from beneath the plunger, are turned a quarter revolution by means of the cranks 40, rods 41, dogs 43, and pins 45, so as to align a new mold with the discharge pipe of the kettle containing the composition. These parts are so constructed and timed that the mold-block begins its rotation just after leaving the plunger and completes the same just about the time it reaches the center of the machine, so that the weight of the plunger 37, will force the target out of its mold onto the conveyer belt, not shown, located underneath the traveling carriage, and operated by any suitable means, as is usual in this class of machines. When a steam pipe is employed in the chamber 59, to heat the kettle, it is necessary to connect the feed-pipe 75, with a pipe extending downwardly through the opening 56, as otherwise the steam would escape through said opening.

Having thus described my invention, what I claim is—

1. In a machine for making composition targets, the combination of a plunger, a device for feeding composition, a carriage, a rotary mold-block carried thereby, and mechanism for moving said carriage, wherein the said mold-block coincides with the said plunger and the said feed device alternately, substantially as described.

2. In a machine for making composition targets, the combination of a plunger, a composition feeding-device, a rotary mold-block having a series of molds, a reciprocating carriage for carrying the mold-block into alternate coincidence with the plunger and feeding device, and mechanism for intermittently rotating the mold-block in one direction when moving from the plunger toward the feed.

3. In a machine for making composition targets the combination of two plungers, a central feed, two mold-blocks adapted to coincide with one plunger and the feed simultaneously, and a carriage for moving said blocks into alternate coincidence with the plungers.

4. In a machine for making composition targets, the combination of two plungers, a central feed, two rotary mold blocks containing a series of molds rotating in vertical planes, a mechanism for intermittently rotating said blocks into position for feeding, compressing, cooling, and dropping the work.

5. In a machine for making composition targets, the combination of a plunger, a mold-block and means for moving the mold-block into and out of coincidence with the plunger, an automatic composition feeding device having coincidence with the mold-block when it is out of coincidence with the plunger, said feed-device consisting essentially of means for establishing a passage from the composition supply tank to the mold block when it is in coincidence therewith.

6. In a machine for making composition targets, the combination with the frame, the brackets, the driving-shaft having worm gears, the transverse shafts provided with cams, the vertically reciprocating plungers having anti-friction rollers with which said cams engage, and provided at their lower ends with formers, of the horizontally reciprocating intermittently rotatable mold blocks, having a series of molds upon their faces adapted to be brought successively into line with said plungers, substantially as described.

7. In a machine for making composition targets the combination with the frame, the brackets, the driving shaft having worm gears, the transverse shafts provided with cams, the vertically reciprocating plungers having anti-friction rollers with which said cams engage, and provided at their lower ends with formers, of the horizontally reciprocating and intermittently rotatable mold blocks having a series of molds upon their faces adapted to be brought successively into line with the formers, and the reciprocating plungers passing through said mold blocks at right angles to each other and communicating with the molds in the mold blocks, substantially as described.

8. In a machine for making composition targets, the combination with the frame, the brackets, the driving shafts having worm gears, the transverse shafts one of which is provided with a disk having a wrist-pin connected with a slotted pitman, the cam secured to said shafts, the plungers having anti-friction rollers with which said cams engage, and the formers on the lower ends of said plungers, of the intermittently rotatable mold blocks, the reciprocating carriage in which said mold blocks are journaled, the pitman connected with said carriage, the crank to which said pitman is pivoted mounted upon a shaft carrying a cog-wheel, the cog-wheel meshing therewith, and with which the slotted pitman is connected, substantially as described.

9. In a machine for making composition targets, the combination with the vertically reciprocating plungers provided with formers, of the intermittently rotatable and horizontally reciprocating mold-blocks, having molds upon their faces, and provided with pins or studs, of the crank-arms loosely mounted on the journals of said mold blocks, and connected with arms pivoted to the machine frame, the spring actuated dogs or pawls adapted to engage with said studs, and means substantially as described for actuating said plungers and mold-blocks.

In testimony that I claim the foregoing as my own I have hereunto affixed my signature in presence of two witnesses.

ALBERT H. HEBBARD.

Witnesses:
C. W. BUTLER,
CHAS. C. HEBBARD.